United States Patent
Bradley et al.

(10) Patent No.: US 9,417,400 B2
(45) Date of Patent: Aug. 16, 2016

(54) SHORT OPTICAL CONNECTOR FOR CABLES CONTAINING A BEND INSENSITIVE FIBER

(71) Applicant: OFS Fitel, LLC, Norcross, GA (US)

(72) Inventors: Kelvin B. Bradley, Lawrenceville, GA (US); Gregory A. Sandels, Buford, GA (US)

(73) Assignee: OFS FITEL, LLC, Norcross, GA (US)

( * ) Notice: Subject to any disclaimer, the term of this patent is extended or adjusted under 35 U.S.C. 154(b) by 371 days.

(21) Appl. No.: 13/780,104

(22) Filed: Feb. 28, 2013

(65) Prior Publication Data

US 2013/0315540 A1 Nov. 28, 2013

Related U.S. Application Data

(60) Provisional application No. 61/651,116, filed on May 24, 2012.

(51) Int. Cl.
G02B 6/36 (2006.01)
G02B 6/38 (2006.01)

(52) U.S. Cl.
CPC .............. G02B 6/381 (2013.01); G02B 6/3887 (2013.01)

(58) Field of Classification Search
None
See application file for complete search history.

(56) References Cited

U.S. PATENT DOCUMENTS

| | | | |
|---|---|---|---|
| 5,481,634 A | 1/1996 | Anderson et al. | |
| 5,915,056 A * | 6/1999 | Bradley et al. | ................... 385/76 |
| 6,357,934 B1 * | 3/2002 | Driscoll | .............. G02B 6/3869 |
| | | | 385/59 |
| 2001/0006573 A1 | 7/2001 | Weigel | |
| 2004/0052474 A1 | 3/2004 | Lampert et al. | |
| 2007/0104445 A1 * | 5/2007 | Larson | ................. G02B 6/3801 |
| | | | 385/134 |
| 2010/0284656 A1 * | 11/2010 | Morra et al. | ..................... 385/78 |

FOREIGN PATENT DOCUMENTS

| | | |
|---|---|---|
| JP | 2004226626 A | 8/2004 |
| JP | 2011008209 A | 1/2011 |
| JP | 2011164548 A | 8/2011 |
| WO | 2007050470 A1 | 5/2007 |

* cited by examiner

*Primary Examiner* — Uyen Chau N Le
*Assistant Examiner* — Chad Smith
(74) *Attorney, Agent, or Firm* — Law Office of Leo Zucker

(57) ABSTRACT

An optical connector has a housing, and a retention member for retaining a cable with a fiber that has a specified minimum bend radius. A rear portion of a connector ferrule and spring are seated in the retention member, a front end of the member engages the connector housing, and the spring urges the ferrule toward the front of the connector housing. An elongated cable support has an axial passage that opens at a front end and at a back end of the support for receiving the cable, and the front end of the support is joined at the rear of the retention member. The passage in the support has a radially outward flare at the back end which acts to limit the cable from bending in the vicinity of the connector, so that the cable fiber is not strained below the specified minimum bend radius.

13 Claims, 2 Drawing Sheets

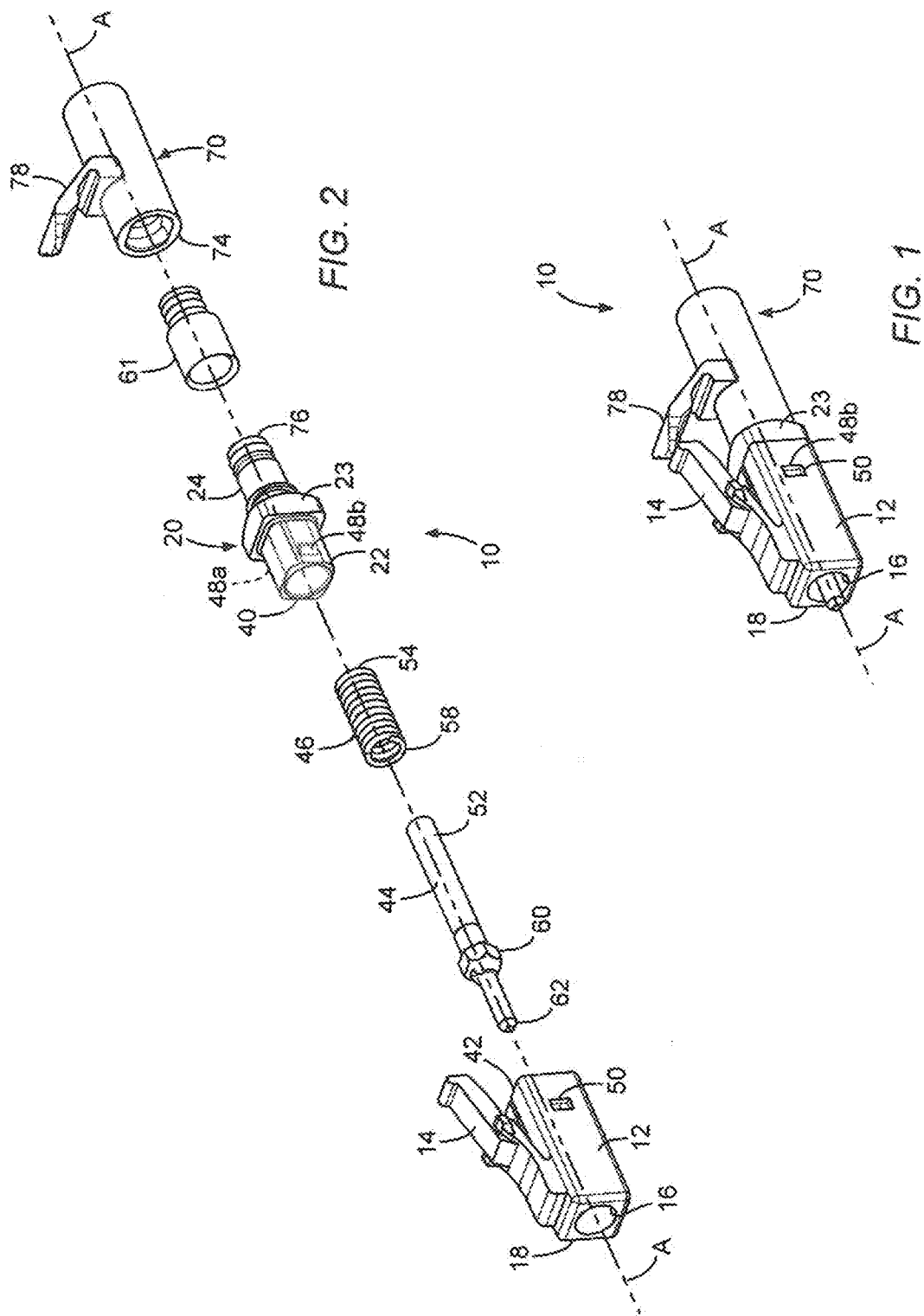

SHORT OPTICAL CONNECTOR FOR CABLES CONTAINING A BEND INSENSITIVE FIBER

CROSS REFERENCE TO RELATED APPLICATION

This application claims priority under 35 U.S.C. §119(e) of U.S. Provisional Patent Application No. 61/651,116 filed May 24, 2012, titled Bend-Insensitive Fiber-Optic Connector, and which is incorporated by reference in its entirety.

BACKGROUND OF THE INVENTION

1. Field of the Invention

The present invention relates to optical connectors, and particularly to a connector suitable for use with a cable containing a bend insensitive fiber (BIF).

2. Discussion of the Known Art

The attenuation of light signals transmitted through an optical fiber increases significantly if the fiber is forced to bend through less than a specified minimum bend radius. Therefore, the degree to which a cable containing an optical fiber bends, particularly in the vicinity of a terminating connector, must be limited to ensure that the bend radius of the fiber in the cable remains at or above the specified minimum. This is usually achieved by providing a lengthy cable support or boot that is fixed at a back end of the connector, large metallic inserts, and/or a length of plastics tubing for supporting the connector ferrule, all of which are, in addition to other parts, needed in order for the connector to couple the fiber optically with another fiber in a mating connector or socket.

The use of angled cable supports, adapters, cable support clips, and/or shortened cable boots offers less than an optimal solution, however. Such parts typically cause the overall length of the connector to lie between 32 mm and 60 mm, thereby consuming valuable equipment space when, e.g., a number of such connectors are deployed to connect with other connectors on both sides of a cable patch panel. Moreover, the connectors often interfere with the closure of doors on the equipment cabinets, causing the associated cables to bend excessively and degrading equipment performance.

As optical connector density increases, much of the space required for the connectors on or inside of equipment should be reduced as much as possible to leave room for other essential optical or electronic equipment components. Shortened optical connectors such as, e.g., the LC BTW FLEX Mini BOOT available from SENKO Advanced Components, Inc., are constructed only for use with cables whose outside diameters are 900 µm or less, and are meant for less stringent applications that involve minimal handling of the connector once the connector is set into a mating connector or socket.

U.S. Pat. Appl'n Pub. No. 2010/0284656 (Nov. 11, 2010) discloses a short profile optical connector that enables optical cables to be terminated, for example, inside of equipment cabinets where minimal space is available for cable routing. The connector includes a rigid curved cable bend limiter at the back of the connector, for guiding a cable containing a bend insensitive fiber through a bend of, e.g., 90 degrees.

With the introduction of highly bend-insensitive optical fibers, connectors for cables containing such fibers need not be as physically robust as prior connectors insofar as having to include integrated cable supports to restrain the cables from bending sharply near the connector. Yet, it is common for manufacturers of BIF patch cords or cables whose outside diameters are as large as, e.g., 1.6 mm to 3.0 mm, to terminate the cords in currently available and relatively long cable connectors.

Accordingly, there is a need for a shorter and yet sturdy optical connector for terminating cables that contain a bend insensitive fiber. Further, there is a need for an optical connector for cables whose outside diameters are greater than 900 µm and which contain a bend insensitive fiber. There is also a need for a short optical connector that limits the degree to which a cable with a bend insensitive fiber can bend in the vicinity of the connector, regardless of the direction at which the cable approaches the connector.

SUMMARY OF THE INVENTION

According to the invention, an optical connector includes a connector housing, and an elongated cable retention member for retaining an optical cable containing a fiber for termination by the connector. The fiber has a specified minimum bend radius, and a front end of the retention member is joined to a rear end of the connector housing. A ferrule and an associated spring are seated in the retention member. The ferrule has a passage for receiving the fiber and presenting an end face of the fiber at a front tip of the ferrule to couple the fiber with another fiber in a mating connector or socket. The spring urges the ferrule toward the front end of the connector housing.

An elongated cable support has an axial passage that opens at a front end and at a back end of the support for a receiving the cable. The front end of the support is joined at a rear end of the retention member. The passage in the support has a radially outward flare in the vicinity of the back end of the support. The flare is tapered in such manner as to limit the cable from bending in the vicinity of the connector so that the cable fiber is not strained below the minimum bend radius of the fiber.

For a better understanding of the invention, reference is made to the following description taken in conjunction with the accompanying drawing and the appended claims.

BRIEF DESCRIPTION OF THE DRAWING

In the drawing:

FIG. 1 is an isometric view of an optical connector according to the invention, showing the connector in an assembled state;

FIG. 2 is an exploded view of the inventive connector in FIG. 1, showing an order of assembly of the parts of the connector;

DETAILED DESCRIPTION OF THE INVENTION

Figure 3:
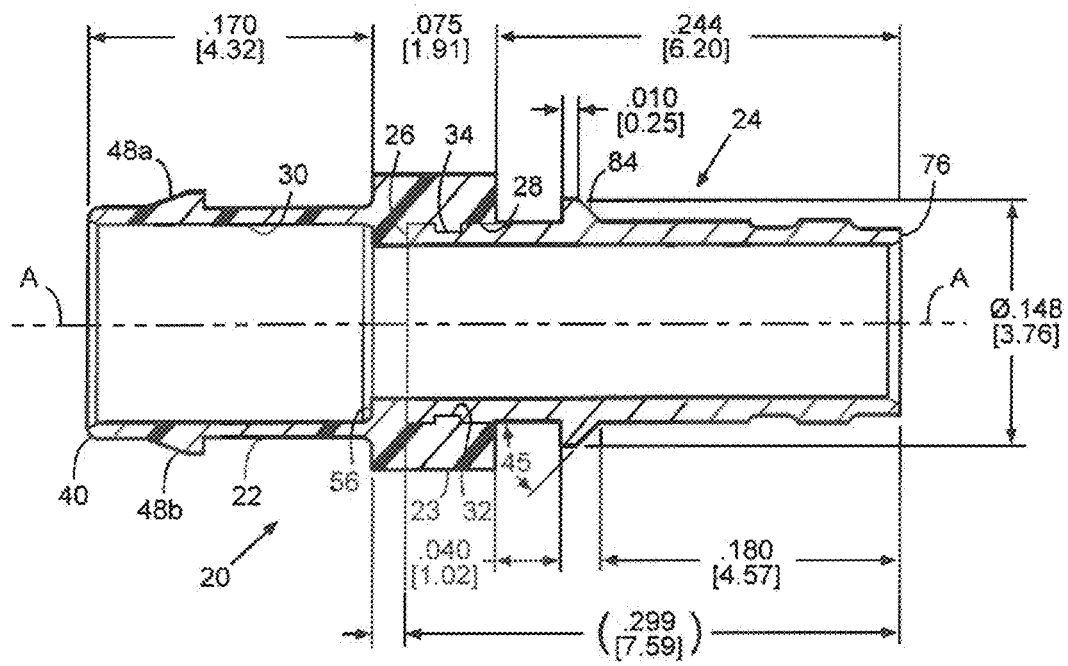
FIG. 3 is an enlarged cross-section of a cable retention member in the connector in FIG. 1, as seen in a plane containing a long axis of the member.

FIG. 1 shows an optical connector 10 according to the invention, in a fully assembled state. FIG. 2 is an exploded view of the connector 10, to illustrate an assembly of component parts of the connector 10. While the connector 10 is disclosed herein as well suited for use with cables that contain bend insensitive fibers (BIFs), it will be understood by persons skilled in the art that the connector can be used to terminate optical cables containing other types of fibers, provided the cables are prevented by other means from such bending as would strain the fibers below their minimum bend radius.

Basically, the connector 10 includes an elongated connector housing 12 having an axis A, a front end 18, and a rear end 42. As shown in the illustrated embodiment, the housing 12 can be a conventional LC type optical connector housing with an integral latch 14 to lock the connector 10 with a mating connector or socket. While not shown in the drawing, the connector 10 may also be provided with a conventional removable dust cap to cover an opening 16 in the front end 18 of the housing 12, in order to prevent particles and moisture from entering and degrading components inside the housing when the connector is not in use.

An elongated cable retention member 20 is constructed and arranged to retain a length of cable containing an optical fiber to be terminated by the connector 10. The fiber may be a so-called bend insensitive fiber (BIF) having a specified minimum bend radius that is substantially less than the minimum bend radii associated with earlier types of optical fibers. FIG. 3 is a cross-sectional view of the cable retention member 20.

In the disclosed embodiment, the retention member 20 is formed of two parts, namely, a front section 22 having an axial passage 30, and a rear insert 24 a forward end 26 of which is positioned in a rear opening 28 of the passage 30 in the front section. The rear opening 28 of the passage 30 is formed through a generally rectangular end collar or cap 23 on the front section.

The front section 22 of the retention member 20 is preferably molded directly over the rear insert 24. As shown in FIG. 3, when the front section 22 is molded onto the rear insert, an annular ring 32 forms radially inward near the rear opening 28 of the passage 30, wherein the ring 32 fills an annular groove 34 formed in the circumference of the rear insert. The front section 22 and the rear insert 24 of the retention member 20 are thus joined or fixed to one another.

The front section 22 of the retention member 20 is preferably made of an elastic or plastics material suitable for injection molding such as, e.g., Radel® R-5100 polyphenylsulfone (PPSU) from Solvay Specialty Polymers. The rear insert 24 may be formed of, e.g., brass or aluminum alloy tube stock that is suitably finished and/or plated. Alternatively, the insert 24 can be die cast and machine finished.

A front end 40 of the retention member 20 is formed for insertion axially through an opening in the rear end 42 of the connector housing 12, and to be joined with the housing 12 after a connector ferrule 44 and an associated spring 46 are seated inside the retention member 20, as explained below. See FIGS. 1 and 2. In the present embodiment, the front section 22 of the retention member has a pair of inclined or wedge-shaped tabs 48a, 48b, that protrude from the outside surface of the section 22 at diametrically opposed locations as shown in FIGS. 1-3. When the front section 22 of the retention member 20 is urged axially into the open rear end 42 of the connector housing as far as the collar 23 on the front section, the protruding tabs 48a, 48b on the section 22 enter into and engage corresponding openings 50 in opposite side walls of the connector housing 12, so that the retention member is locked in place to the connector housing.

A rear portion 52 of the connector ferrule 44 is inserted axially in the passage 30 in the retention member 20, after the spring 46 is disposed coaxially about the ferrule 44. A back end 54 of the spring 46 seats against a radially inward step 56 in the passage 30 (see FIG. 3), and a front end 58 of the spring abuts a stop 60 formed at a determined position along the length of the ferrule 44 (see FIG. 2). The spring 46 therefore urges the ferrule 44 axially toward the front end 18 of the connector housing 12 when the retention member 20 and the housing 12 are joined to one another.

Figure 4:
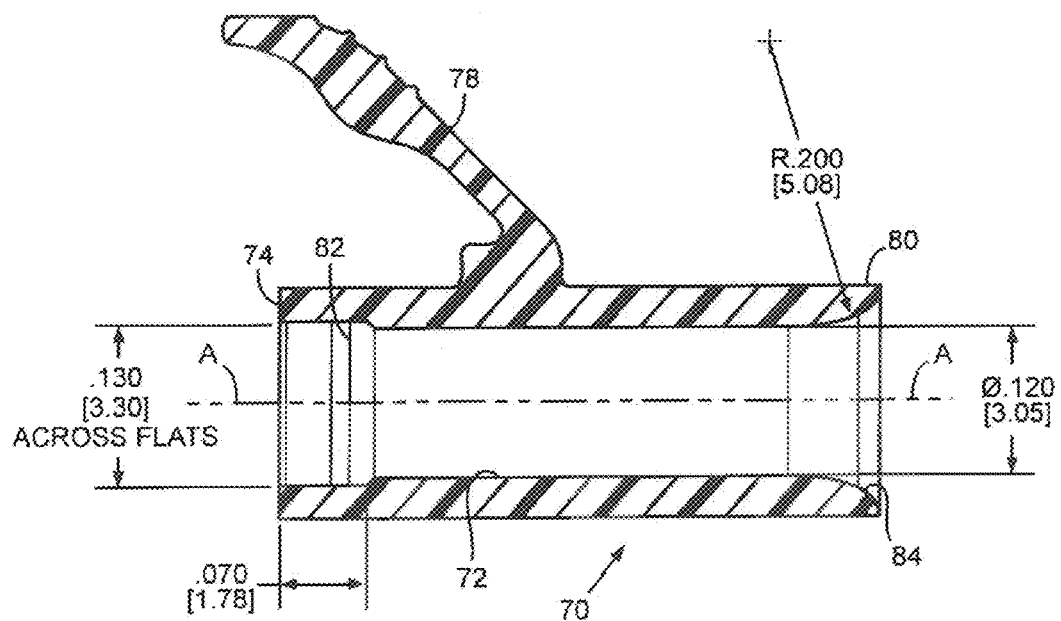
FIG. 4 is an enlarged cross-section of a cable support in the connector in FIG. 1 according to the invention, as seen in a plane containing a long axis of the support.

FIG. 4 is a cross-sectional view of an elongated cable support 70 that is fixed at the back of the connector 10 as shown in FIGS. 1 and 2. The cable support 70 has a an axial passage 72 that extends between an open front end 74 and an open back end 80 of the support. The front end 74 of the cable support 70 is dimensioned and formed to receive a back end 76 of the rear insert 24 of the retention member 20 (see FIG. 2), and to allow the rear insert 24 to be urged axially into the passage 72 in the cable support 70 as far as the collar 23 on the retention member 20. See FIG. 1. An annular recess 82 formed in the passage 72 of the cable support 70, is located so as to seat an annular step 84 that protrudes from the circumference of the rear insert 24 (see FIG. 3), thus joining the cable support 70 and the retention member 20 firmly to one another.

In use, an end length of an optical cable to be terminated by the connector 10 is inserted through the support member 70. A crimp sleeve 61 (FIG. 2) is placed over the length of cable, and the cable jacket is stripped to expose strength members that are provided within or beneath the jacket over the entire length of the cable. Further layers are then stripped to expose a certain length of the cable fiber. The crimp sleeve 61 is inserted over the rear insert 24 of the retention member 20, with the cable strength members disposed between the sleeve 61 and the insert 24, and sleeve 61 is crimped in a known manner. The exposed cable fiber is inserted through an axial passage in the ferrule 44 until an end face of the fiber protrudes out of a front tip 62 of the ferrule. The end face of the fiber is cleaved close to the front tip 62 of the ferrule, and the fiber end face is polished to be substantially flush with the ferrule tip 62 to enable the fiber to connect optically with another fiber through the front opening 16 in the connector housing 12.

As shown in FIG. 4, a trigger 78 extends upward from the body of the cable support 70, and is inclined toward the front end 74 of the support. The trigger 78 is dimensioned and arranged so that when the connector 10 is assembled as in FIG. 1 and the trigger is depressed, the trigger urges the latch member 14 on the connector housing 12 downward and out of engagement with a mating connector or socket. The cable support 70 including the trigger 78 are preferably molded integrally from a plastics material such as, e.g., Vestamid® X7166 Polyamide 12 from Evonik Degussa GmbH.

The axial passage 72 through the cable support 70 is of such size as to receive a fiber optic cable that contains a bend insensitive fiber. In particular, the passage 72 may be of a size that accommodates cables having outside diameters greater than 900 μm, for example, between 1.6 mm and 3.0 mm such as the currently available BIF cables or patch cords. For example, for a cable having a 3.0 mm O.D., the minimum inside diameter D of the passage 72 is preferably about 0.120 inch (3.05 mm). For cables with other O.D.s, the minimum inside diameter D of the support 70 is preferably between 0.05 mm and 0.1 mm greater than the cable outer diameter.

The passage 72 in the cable support 70 is "trumpeted" or formed to have a radially outward flare 84 where the passage approaches the back end 80 of the support. The flare 84 is tapered to limit the degree to which a cable containing a bend insensitive fiber terminating in the connector 10 may bend in the vicinity of the support 70, so that the fiber is not strained below its minimum bend radius. For example, to accommodate a 3.0 mm O.D. cable containing a BIF having a minimum bend radius of 5 mm, the flare 84 should have a radius of curvature R of not less than about 0.200 inch (5.08 mm).

Typical, non-critical dimensions for other parts of the connector 10 are given in the drawing figures, and may vary from those shown depending on the particular application.

Also, as seen in FIG. 4, because the cable support 70 is coaxial with the axis A of the connector 10 over the length of the support including the back end 80, the support will act to limit cable bending in the vicinity of the connector regardless of the direction at which the cable approaches the connector for termination.

As disclosed herein, the connector 10 uses advantageously the flexibility allowed by currently available bend insensitive fibers with respect to the degree to which cables containing such fibers can bend in the vicinity of a connector. The connector has all the mechanical and optical features needed to connect a BIF with another fiber in a mating connector or socket, and significantly reduces the number and size of mechanical parts ordinarily needed for fiber optical connectors. The cable support 70 may be relatively short, e.g., only about 0.472 in. (12.00 mm) length, and the flare 84 at the back end of the support passage 72 ensures a safe cable bend regardless of the direction the cable approaches the connector. Further, the connector 10 may be as short as 25 mm from the back end 80 of the cable support 70 to the front end 18 of the connector housing 12, and still include the trigger 78 and other desirable features.

While the foregoing represents preferred embodiments of the present invention, it will be understood by persons skilled in the art that various modifications, additions, and changes can be made without departing from the spirit and scope of the invention. Accordingly, the invention includes all such modifications, additions, and changes as are within the scope of the appended claims.

We claim:

1. An optical connector for cables containing a bend insensitive fiber, comprising:
    a connector housing having an axis, a front end, and a rear end;
    an elongated cable retention member having a front end and a rear end, the elongated cable retention member has an axial passage to receive a length of cable containing a bend insensitive fiber (BIF) having a minimum bend radius for termination, and the front end of the elongated cable retention member is joined to the rear end of the connector housing;
    a ferrule, a rear portion of which is inserted axially in the passage in the elongated cable retention member, and the ferrule has a passage for receiving the BIF and presenting an end face of the BIF at a front tip of the ferrule to couple the BIF with another optical fiber in a mating connector or socket;
    a spring associated with the ferrule for urging the ferrule in a direction toward the front end of the connector housing, and the spring is seated inside the elongated cable retention member;
    an elongated, straight cylindrical cable support having an axial passage that opens at a front end and at a back end of the straight cylindrical cable support for receiving the length of cable, and the front end of the straight cylindrical cable support is dimensioned and formed to receive the rear end of the elongated cable retention member so that the straight cylindrical cable support and the elongated cable retention member are joined axially with one another;
    the axial passage in the straight cylindrical cable support has a radially outward flare as the axial passage approaches the back end of the straight cylindrical cable support, and the radially outward flare is tapered to limit the degree to which the length of cable bends in the vicinity of the straight cylindrical cable support regardless of the direction the length of cable approaches the connector housing for termination, so that the BIF contained in the length of cable is not strained below the minimum bend radius of the BIF;
    wherein the radially outward flare of the axial passage in the straight cylindrical cable support has a radius of curvature of not less than 0.200 inches (5.08 mm); and
    the axial passage in the straight cylindrical cable support has an inside diameter sufficient to accommodate the length of cable having an outside diameter greater than 900 μm.

2. An optical connector according to claim 1, wherein the connector housing has a latch dimensioned and arranged to lock the connector housing with a mating connector or socket.

3. An optical connector according to claim 2, wherein the straight cylindrical cable support includes a trigger that extends upward and toward the front end of the straight cylindrical cable support so that when depressed, the trigger urges the latch on the connector housing downward and out of engagement with a mating connector or socket.

4. An optical connector according to claim 3, wherein the straight cylindrical cable support and the trigger are molded integrally from a plastics material.

5. An optical connector according to claim 4, wherein the plastics material comprises polyamide 12.

6. An optical connector according to claim 1, wherein the axial passage in the straight cylindrical cable support has an inside diameter that is between 0.05 and 0.1 mm greater than an outside diameter of the length of cable accommodated by said passage.

7. An optical connector according to claim 6, wherein the axial passage in the straight cylindrical cable support has a minimum inside diameter of 3.05 mm to accommodate the length of cable having an outside diameter of 3.0 mm.

8. An optical connector according to claim 1, wherein the straight cylindrical cable support has a length of 12 mm.

9. An optical connector according to claim 1, wherein the length between the front end of the connector housing and the back end of the straight cylindrical cable support is 25 mm.

10. An optical connector according to claim 1, including a crimp sleeve formed and dimensioned to be inserted over the rear end of the elongated cable retention member after strength members of the length of cable are disposed between the crimp sleeve and the elongated cable retention member.

11. An optical connector according to claim 1, wherein the elongated cable retention member comprises a front section and a rear insert, a forward end of the rear insert is positioned in a rear opening of the front section, the front section is made of an elastic or plastics material suitable for injection molding, and the rear insert is formed of a metal alloy.

12. An optical connector according to claim 11, wherein the front section of the elongated cable retention member is molded over the rear insert.

13. An optical connector according to claim 11, wherein the front section of the elongated cable retention member comprises polyphenylsulfone (PPSU).

* * * * *